(12) United States Patent
Butler

(10) Patent No.: US 6,313,753 B1
(45) Date of Patent: Nov. 6, 2001

(54) FILL AND DISCHARGE SERVICE ALIGNMENT DEVICE

(76) Inventor: Albert E. Butler, 748 Hamilton La., Fallbrook, CA (US) 92028-1865

( * ) Notice: Subject to any disclaimer, the term of this patent is extended or adjusted under 35 U.S.C. 154(b) by 0 days.

(21) Appl. No.: 09/670,336

(22) Filed: Sep. 27, 2000

(51) Int. Cl.[7] .................................................. G08B 21/00
(52) U.S. Cl. ..................... 340/686.2; 340/686.1; 340/686.6; 340/517; 340/524; 340/435; 340/438
(58) Field of Search ..................... 340/932.2, 988, 340/431, 435, 438, 459, 691.6, 687, 686.2, 903, 901, 938, 517, 524, 815.4, 686.1, 686.6

(56) References Cited

U.S. PATENT DOCUMENTS

| D. 400,115 | 10/1998 | Yaron et al. ................. D10/104 |
| 5,806,019 | 9/1998 | Ishiyama .................... 701/300 |
| 5,940,011 | 8/1999 | Agravante et al. ........... 340/903 |
| 5,959,555 | 9/1999 | Furuta ........................ 340/937 |
| 6,061,002 | 5/2000 | Weber et al. ................ 340/932.2 |
| 6,100,796 | 8/2000 | Wagner et al. .............. 340/435 |
| 6,154,149 | * 11/2000 | Tyckowski et al. .......... 340/903 |
| 6,178,650 | * 1/2001 | Thibodeaux ................. 33/286 |
| 6,204,755 | * 3/2001 | Kikuchi ...................... 340/435 |
| 6,222,447 | * 4/2001 | Schofield et al. ............ 340/461 |

* cited by examiner

Primary Examiner—Jeffrey Hofsass
Assistant Examiner—Toan Pham
(74) Attorney, Agent, or Firm—Siemens Patent Services, LC

(57) ABSTRACT

Travel trailer and motor home users must periodically use various facilities for filling motor fuel tanks and water storage tanks of their vehicles, as well as dumping their waste water and sewerage receptacles. Typically the fill or discharge receptacles for these different tanks are located at different locations along the length of the vehicle, making it difficult to align the vehicle with the different service facilities. The present invention comprises a device whereby a driver can accurately line up fill and discharge receptacles with the corresponding service at a service station or dump station without the aid of a second person or the need for leaving the vehicle.

8 Claims, 2 Drawing Sheets

FILL AND DISCHARGE SERVICE ALIGNMENT DEVICE

BACKGROUND OF THE INVENTION

1. Field of the Invention

The present invention relates to the automotive industry, especially as it relates to large or towed vehicles, such as camping trailers or motor homes. More particularly, the invention comprises a device whereby a motorist can accurately line up fill and discharge receptacles of a vehicle such as a motor home or camping trailer with the corresponding service at a service station or dump station without leaving his vehicle.

2. Description of the Prior Art

U.S. Pat. No. 6,100,796, issued to Armin Wagner, et. al., on Aug. 8, 2000, presents an OBSTACLE RECOGNITION SYSTEM IN A MOTOR VEHICLE, a device for identifying an object within an object within a given area in relation to a vehicle and then determining whether a relative change in position is occurring. When, in a first step, sensors, such as ultrasonic, radar, or laser, mounted on the vehicle, pick up an object within their range, a control device determines the distance to the obstacle. In a second step, the control device determines whether a change in relative distance has occurred. If the relative distance has decreased, an alarm is sounded, but if the relative distance has remained constant or increased, the alarm is suppressed. The present invention measures only linear distance traveled by the equipped vehicle the rather than relative positions of the equipped vehicle and a target object, as does Wagner.

U.S. Pat. No. 6,061,002, issued to Jens Weber, et. al., on May 9, 2000, presents a DEVICE AND METHOD FOR PARKING MOTOR VEHICLE, an electronic assist for locating a sufficiently large parking space and guiding a vehicle into the selected space. A combination of distance, movement, and angle sensors communicate with a control module in such a way as to inform a driver of when to turn the steering wheel and direction to turn the steering wheel, and, if necessary, when to reverse direction of the steering wheel. The present invention measures only linear distance traveled by the equipped vehicle the rather than relative positions to other vehicles or directions of travel, as in Weber.

U.S. Pat. No. 5,959,555, issued to Yoshihisa Furuta on Sep. 28, 1999, presents an APPARATUS FOR CHECKING BLIND SPOTS OF VEHICLE, in which an array of video sensors mounted at the front, sides and/or rear of a vehicle relay a graphic image to a video display unit within the vehicle to inform the driver of conditions around the vehicle. The present invention relies on more economical means than does Furuta to relay linear distance traveled to inform the driver of alignment of the vehicle fill and discharge receptacles and services.

U.S. Pat. No. 5,940,011, issued to Hiroshi H. Agravante, et. al., on Aug. 17, 1999 presents a COMPACT VEHICLE BASED REAR AND SIDE OBSTACLE DETECTION SYSTEM INCLUDING MULTIPLE ANTENNAE, wherein reflected radiation beam signals alert a driver to objects within six overlapping zones around the vehicle, including a warning of vehicles approaching at a speed to be entering the side zones. Again, the present invention relies on more economical means than does Agravante and relays only linear distance traveled.

U.S. Pat. No. 5,806,019, issued to Mahito Ishiyama on Sep. 8, 1998, presents an OBJECT DETECTING PROCESS IN VEHICLE, wherein a reflected radiation beam signal alerts a driver to objects within the detection zone (typically in front of the vehicle) and the relative speed of the detected object to the base vehicle. Additionally, detection and relative speed of multiple targets is possible. Once again, the present invention relies on more economical means to report only linear distance traveled by the base vehicle.

None of the above inventions and patents, taken either singly or in combination, is seen to describe the instant invention as claimed.

SUMMARY OF THE INVENTION

Travel trailer and motor home users must periodically use various facilities for filling motor fuel tanks and water storage tanks of their vehicles, as well as dumping their waste water and sewerage receptacles. Typically the fill or discharge receptacles for these different tanks are located at different locations along the length of the vehicle, making it difficult to align the vehicle with the different service facilities. The present invention comprises a device whereby a motorist can accurately line up fill and discharge receptacles with the corresponding service at a service station or dump station without the aid of a second person or the need for leaving his vehicle.

Accordingly, it is a principal object of the invention is to provide a method for aligning fill and discharge receptacles of a motor vehicle or trailer with the corresponding service facility that is easy to use.

It is another object of the invention to is to provide a method for aligning fill and discharge receptacles of a motor vehicle or trailer with the corresponding service facility that is accurate.

It is a further object of the invention is to provide a method for aligning fill and discharge receptacles of a motor vehicle with the corresponding service facility that is easy and economical to install.

Still another object of the invention is to provide a method for aligning fill and discharge receptacles of a motor vehicle or trailer with the corresponding service facility that is It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
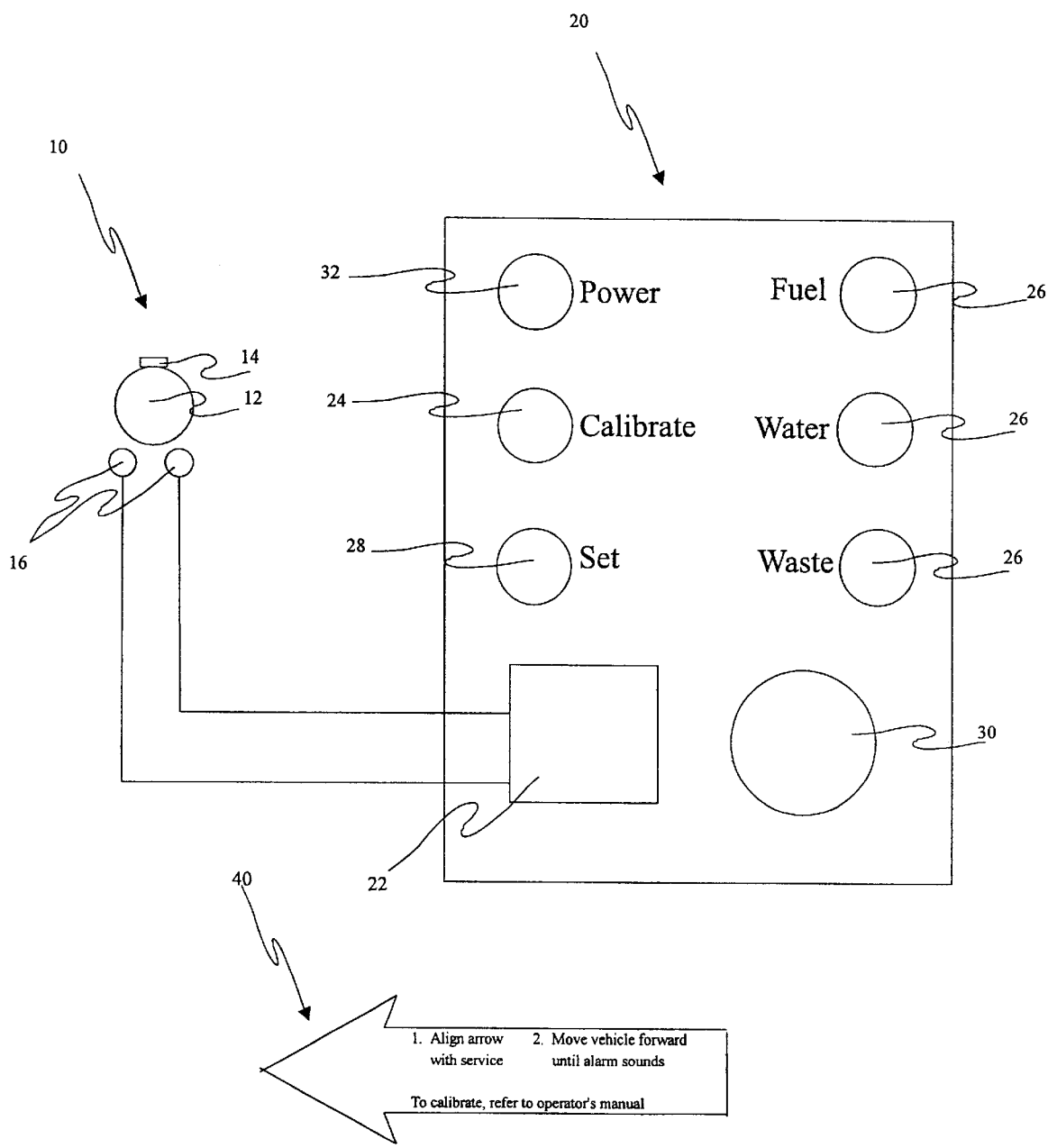
FIG. 1 is a diagrammatic view of the invention.
Figure 2:
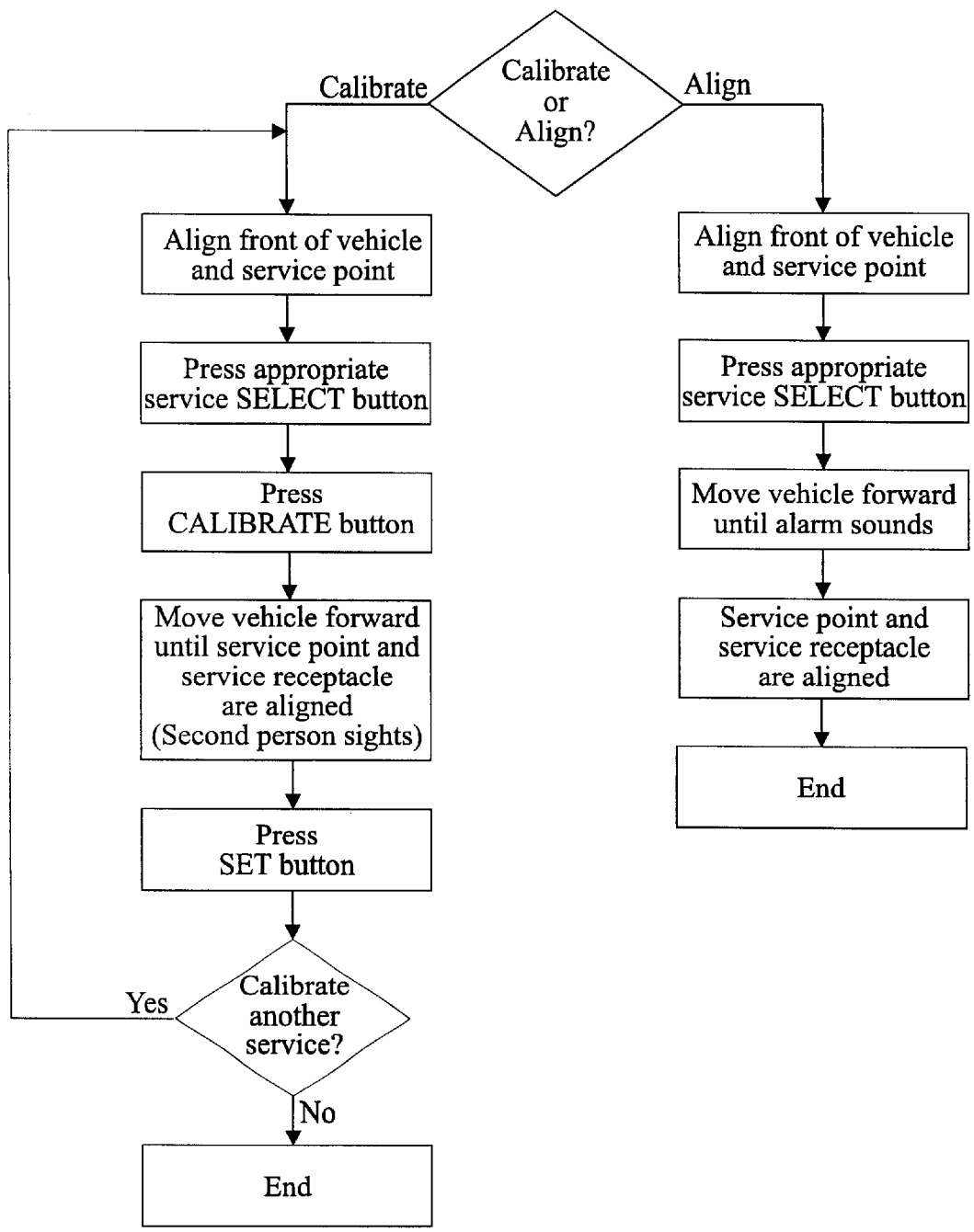
FIG. 2 is a flow chart of the operation of the invention.

Referring now to FIG. 1, the present invention has sensing unit 10 composed of a magnet 14 mounted on the vehicle drive shaft 12 such that as drive shaft 12 turns, electronic sensors 16 receive the magnetic impulse from magnet 14 as it passes electronic sensors 16, facilitating a counting of the revolutions of the drive shaft. Utilization of more than one electronic sensor 16 facilitates determination of the direction of rotation of the drive shaft, and thus calculation of distance traveled in either forward or reverse. It would be evident to one skilled in the art, however, that a number of different sensing devices could be used to count drive shaft or wheel revolutions, such as, but not limited to, the existing odometer mechanism.

Within the vehicle is a control module 20 with a micro processor chip 22, a calibrate button 24, a plurality of service select buttons 26, a set button 28, an indicator means 30, and a power button 32.

After initial installation the device must be calibrated by aligning the desired service point with an easily aligned location on the vehicle, such as the driver's window pillar. An arrow 40 sticker is provided to aid in alignment. When the vehicle and service point are aligned, the appropriate service select button 26 is pressed. Next the calibrate button 24 is pressed, clearing any previously stored entry, and the vehicle is moved forward, with a second person sighting, to align the service point with the service receptacle on the vehicle. When the service point and service receptacle are aligned the set button 28 is pressed, recording the number of revolutions of drive shaft 12, as counted by magnet 14 and electronic sensors 16. The process is repeated for each service receptacle that is being calibrated.

After calibrating, whenever services are required, the driver aligns the arrow 40 sticker with the service point, presses the appropriate service button 26, and moves the vehicle forward. As the vehicle moves, electronic sensors 16 count the revolutions of drive shaft 12, based on the passing of magnet 14, comparing each count to the number stored by micro processor chip 22 for the chosen service select button 26. When a match is made an audible or visual indicator alarm is activated to tell the driver that the service point and service receptacle are aligned.

While the thrust of the present invention is primarily toward recreational vehicles, it would be evident that its use could be equally applicable to other large vehicles, such as tractor-trailers with tanks mounted on the trailers, especially when towing double and triple trailers.

It is to be understood that the present invention is not limited to the embodiments described above, but encompasses any and all embodiments within the scope of the following claims.

What is claimed is:

1. A device for aligning fill and discharge service receptacles on a vehicle with corresponding fill and discharge service points, comprising:
   means for measuring the linear distance traveled by said vehicle and generating a signal representative thereof;
   a control module for receiving said signal, comprising:
      means for storing data representative of at least one distance said vehicle must move from a reference point to be substantially aligned with at least one service point; and
      a comparator operatively connected to said control module for comparing said signal with said data and generating an output signal indicating that said vehicle has traveled a distance substantially the same as said at least one predetermined distance; and
   indicating means to alert an operator of said vehicle that said vehicle has traveled approximately said at least one predetermined distance.

2. A device for aligning fill and discharge service receptacles on a vehicle with corresponding fill and discharge service points, as defined in claim 1, wherein
   said means for measuring the linear distance traveled by said vehicle comprises:
      at least one magnet mounted on the drive shaft of said vehicle and
      at least one electronic sensor to record the magnetic field of said at least one magnet as it passes said at least one electronic sensor on each revolution of said drive shaft.

3. A device for aligning fill and discharge service receptacles on a vehicle with corresponding fill and discharge service points, as defined in claim 1, wherein
   said means for storing data representative of at least one distance said vehicle must move from a reference point to be substantially aligned with at least one service point comprises:
      a micro processing chip and software contained thereon,
      at least one service select button,
      a calibrate button for initiating calibration of selected of said at least one service select button,
      a set button for entering the calibration of selected of said at least one service select button; and
   said comparator is a software application stored on said micro processing chip.

4. A device for aligning fill and discharge service receptacles on a vehicle with corresponding fill and discharge service points, as defined in claim 1, wherein
   said indicating means is an audible alarm.

5. A device for aligning fill and discharge service receptacles on a vehicle with corresponding fill and discharge service points, as defined in claim 1, wherein
   said indicating means is an illuminated, visual alarm.

6. A device for aligning fill and discharge service receptacles on a vehicle with corresponding fill and discharge service points, as defined in claim 1, wherein
   said indicating means is a decal bearing an arrow which can be mounted to the vehicle at a point clearly visible to the driver of said vehicle.

7. A device, for aligning fill and discharge service receptacles on a vehicle with corresponding fill and discharge service points, comprising:
   means for measuring the linear distance traveled by said vehicle and generating a signal representative thereof, comprising;
      at least one magnet mounted on the drive shaft of said vehicle and
      at least one electronic sensor to record the magnetic field of said at least one magnet as it passes said at least one electronic sensor on each revolution of said drive shaft;
   a control module for receiving said signal, further comprising:
      means for storing data representative of at least one distance said vehicle must move from a reference point to be substantially aligned with at least one service point, said means for storing data further comprising;
         a micro processing chip and software contained thereon,
         a plurality of service select buttons for selecting the desired one of said services to be used,
         a calibrate button for initiating the calibration of said data for said one of said services to be aligned,
         a set button for storing said data for said one of said services being aligned
         a signal means, and a power on/off switch; and a comparator operatively connected to said control module for comparing said signal with said data and generating an output signal indicating that said vehicle has traveled a distance substantially the same as said at least one predetermined distance, said comparator being a software application stored on said micro processing chip.

8. A method of aligning fill and discharge service receptacles on a vehicle with corresponding fill and discharge service points, in combination with a device for aligning fill and discharge receptacles on a vehicle with corresponding fill and discharge service points, said device for aligning fill and discharge receptacles on a vehicle with corresponding fill and discharge service points comprising:

means for measuring the linear distance traveled by said vehicle and generating a signal representative thereof, comprising;

at least one magnet mounted on the drive shaft of said vehicle and at least one electronic sensor to record the magnetic field of said at least one magnet as it passes said at least one electronic sensor on each revolution of said drive shaft;

a control module for receiving said signal, further comprising:

means for storing data representative of at least one distance said vehicle must move from a reference point to be substantially aligned with at least one service point, said means for storing data further comprising;

a micro processing chip and software contained thereon, a plurality of service select buttons for selecting the desired one of said services to be used, a calibrate button for initiating the calibration of said data for said one of said services to be aligned, a set button for storing said data for said one of said services being aligned a signal means, and a power on/off switch; and a comparator operatively connected to said control module for comparing said signal with said data and generating an output signal indicating that said vehicle has traveled a distance substantially the same as said at least one predetermined distance, said comparator being a software application stored on said micro processing chip; and said method further comprising:

calibration of said device for aligning fill and discharge receptacles on a vehicle with corresponding fill and discharge service points, comprising:

aligning a marked point at the front a said vehicle with said service point;

pressing the one of said at least one service select button corresponding to the type of said service point;

pressing said calibrate button;

moving said vehicle forward, with a second person assisting in sighting, until fill or discharge receptacle of said vehicle corresponding to said type of service point is aligned with said service point; and pressing said set button to enter said data into said data storage means; and repeating said calibration procedure for each of said at least one service select button; and use of said device for aligning fill and discharge receptacles on a vehicle with corresponding fill and discharge service points, comprising:

aligning said marked point at the front a said vehicle with said service point;

pressing the one of said at least one service select button corresponding to the type of said service point;

moving said vehicle forward until said signal means is activated, signaling that said fill or discharge receptacle is substantially aligned with said service point.

* * * * *